Patented Jan. 21, 1936

2,028,632

UNITED STATES PATENT OFFICE 2,028,632

MANUFACTURE OF PHOSPHATES

George E. Taylor, Westfield, N. J., assignor to General Chemical Company, New York, N. Y., a corporation of New York No Drawing. Application July 12, 1932, Serial No. 622,106

21 Claims. (Cl. 23—107)

This invention relates to the manufacture of alkali metal phosphates and more particularly to a method for the removal from phosphate liquors of coloration caused by organic matter and other oxidizable material. In its more specific aspects, the invention is directed to the production of alkali metal phosphates by a method including as one phase thereof a treatment of the process liquors to effect decolorization of organic matter therein, and utilizing in such method as a source of alkali and phosphate, crude phosphoric acid and the alkali metal phosphate mother liquors resulting from the production of alkali metal phosphates by neutralizing phosphoric acid with alkali carbonate and caustic alkali according to well known methods.

The mother liquors from such processes contain substantial amounts of tri-alkali phosphate and various impurities, including organic matter and alkali metal sulfate. In order to regulate the amount of impurities in the mother liquor, the latter has been utilized as a constituent of a mix for furnacing in accordance with the process of Levermore U. S. Patent No. 1,866,657, granted July 12, 1932.

The principal object of the present invention lies in the provision of a process for decolorizing phosphate process liquors and for making alkali metal phosphate utilizing alkali metal phosphate mother liquors as one source of alkali and phosphate whereby any quantities of such mother liquors may be employed substantially without regard to the amount of oxidizable impurities contained therein, which impurities, if permitted to accumulate, discolor the final products.

For convenience, the invention will be described in connection with the manufacture of sodium phosphates, although the invention is obviously applicable to the production of other alkali metal phosphates.

The invention comprehends a process for decolorizing phosphate process liquors comprising treatment of such liquors with a decolorizing agent adapted to react with the liquor to form a phosphate and to oxidize discoloring impurities, the reduction product of the oxidizing agent being removed from the liquor on addition of alkali. More particularly, the invention comprises the treatment of phosphate process liquors containing oxidizable impurities and phosphoric acid with chromic acid or salts of chromic acid, such as alkali chromate or alkali bichromate. In one preferred embodiment, the invention may be advantageously carried out in conjunction with the recovery of phosphate and alkali metal from alkali metal phosphate mother liquors. When so operated the invention contemplates the preparation of a phosphoric acid solution, containing soluble calcium, as in the form of mono-calcium phosphate, preferably by the digestion of phosphate rock with phosphoric acid. The acid solution, after the separation therefrom of calcium sulfate and other undissolved solids, is treated preferably with tri-sodium phosphate mother liquor containing sodium compounds including sodium sulfate in quantities such that the sodium sulfate of the mother liquor reacts with the mono-calcium phosphate of the acid solution to precipitate substantially all of the sulfate as calcium sulfate. The reaction of the sodium sulfate of the mother liquor and the mono-calcium phosphate of the acid solution produces principally mono-sodium phosphate and calcium sulfate, and at the same time, the tri-sodium phosphate and the sodium of the other sodium compounds in the mother liquor react with the phosphoric acid to form mono-sodium phosphate. After settling and separation of the mud, containing chiefly calcium sulfate, the solution is treated in a hereinafter specified manner with a decolorizing agent, preferably sodium bichromate, to decolorize impurities in the liquor, such as organic matter, which tend to discolor the alkali phosphate product. Following such treatment, the resulting clear solution containing chiefly mono-sodium phosphate and phosphoric acid, is further neutralized by the addition of suitable quantities of soda ash to produce the desired alkali phosphate, and to simultaneously precipitate chromium along with the so-called "white muds" whereby the chromium is eliminated from the phosphate solution.

More particularly, the phosphoric acid solution employed for treatment of the mother liquor is made up, preferably, by digesting phosphate rock with phosphoric acid ($H_3PO_4$) containing, for example, about 15–17% $P_2O_5$ and a small amount of sulfuric acid, so as to produce a phosphoric acid solution containing about 18 to 20% $P_2O_5$ and preferably more than about 3.3% mono-calcium phosphate. A suitable phosphoric acid solution containing the proper amount of mono-calcium phosphate may also be prepared directly by digesting phosphate rock with a deficiency of sulfuric acid. However the acid solution is made up, the calcium sulfate, formed by the reaction of the phosphate rock and phosphoric or sulfuric acid, together with other insoluble impurities are separated from the solution after digestion by settling and decantation, or by other suitable means. While the acid solution should, as noted, contain preferably more than 3.3% mono-calcium phosphate, acid solutions containing less than 3.3% may be utilized.

The tri-sodium phosphate mother liquors contain in addition to tri-sodium phosphate various quantities of other sodium compounds such as sodium sulfate ($Na_2SO_4$), sodium carbonate ($Na_2CO_3$), sodium aluminate ($NaAlO_2$), sodium hydroxide (NaOH), together with small amounts of oxidizable impurities such as organic matter, and other soluble impurities.

The clear phosphoric acid solution containing mono-calcium phosphate obtained by the digestion of phosphate rock and phosphoric acid is now treated with tri-sodium phosphate mother liquor in quantities sufficient so that in the resulting solution, the sulfate of the sodium sulfate of the mother liquor reacts with the calcium of the calcium mono-phosphate of the acid solution and so that the remaining total alkaline sodium compounds in the mother liquor will neutralize the acid solution to such an extent that the mixed solution of mother liquor and phosphoric acid will contain more than 50% of its $P_2O_5$ content as phosphoric acid. The sulfate of the sodium sulfate of the mother liquor and the calcium of the mono-calcium phosphate produce calcium sulfate, and the phosphoric acid of the acid solution reacts with the tri-sodium phosphate and other sodium compounds such as sodium carbonate and sodium hydroxide to form mono-sodium phosphate.

The purpose of regulating the amount of mother liquor added to the phosphoric acid solution so that the total alkaline sodium compounds in the mother liquor, aside from the neutral sodium sulfate, will neutralize the phosphoric acid solution to such an extent that the mixed solution of mother liquor and phosphoric acid will contain more than 50% of its $P_2O_5$ content as phosphoric acid, the remainder being mono-sodium phosphate, is to prevent precipitation, at this stage, of the so-called "white mud", containing phosphates of iron, calcium, and aluminum, and sodium fluosilicate, which precipitation interferes with the settling or filtering out of the calcium sulfate. Although not likely to occur in practice, should a situation arise in which the quantity of the sodium sulfate in the mother liquor is insufficient to provide in the mixed solution of mother liquor and phosphoric acid reacting proportions of sodium sulfate and mono-calcium phosphate, but the remaining alkaline sodium compounds of the mother liquor are present in quantities great enough to neutralize the acid solution to such an extent that the mixed solution of mother liquor and phosphoric acid will contain less than 50% of its $P_2O_5$ content as phosphoric acid, the proper balance in the mixed solution of mother liquor and phosphoric acid may be obtained by the addition thereto of a suitable amount of phosphoric acid containing no mono-calcium phosphate. On completion of the reactions resulting from the addition of the mother liquor to the phosphoric acid solution, the liquor is filtered or settled to effect removal of the calcium sulfate and other insoluble impurities from the solution now containing a mixture of phosphates.

Preferably at this stage where the solution is acid, the solution is treated with sodium bichromate to bring about decolorization of oxidizable impurities which, if present in excess of certain minimum amounts, impart undesirable color to the ultimate product. According to the invention, 50 to 80% of the matter, causing coloration, mostly of an organic character may be readily oxidized or removed from the solution at this point.

According to the requirements of the particular solution obtained on admixture of the alkali phosphate mother liquor and the crude phosphoric acid, the necessary quantity of sodium bichromate is dissolved in water and added to the solution. The ensuing reaction may take place at room temperature, and for convenience, assuming that carbon is the oxidizable substance, the oxidation of the same may be represented by the following equation:

(1) $2Na_2Cr_2O_7 + 3C + 8H_3PO_4 =$
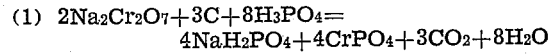
$4NaH_2PO_4 + 4CrPO_4 + 3CO_2 + 8H_2O$ The oxidizable substance may be present as one or several organic compounds instead of as carbon. The exact nature of the reaction taking place is not known, but the result is that the color of the organic matter is bleached by oxidation.

With respect to one particular solution obtained by the addition of alkali phosphate mother liquor to crude phosphoric acid, 0.4 lbs. of sodium bichromate per ton of mixed liquor was found to be the optimum proportion for causing substantially complete decolorization of the organic matter. Obviously, the quantity of organic matter present in the mixed process liquors may vary, and for the purpose of determining the proper amount of sodium bichromate to be added to any particular solution, the following preliminary test may be employed. Add, with constant stirring, a solution of sodium bichromate (20 grams of $Na_2Cr_2O_7.2H_2O$ per liter) to 1000 grams at room temperature of the mixed liquor to be treated. The point at which a yellow tinge overshadows the resultant clear green color will indicate a definite excess of sodium bichromate, and a quantity corresponding to about 80% of this amount should preferably be used in the plant scale operation. Each cubic centimeter of the above bichromate solution added to 1000 grams of the mixed mother liquor and phosphoric acid will correspond to 0.04 lb. of sodium bichromate per ton of mixed liquor.

On determination of the proper quantity of sodium bichromate with respect to the particular mixed liquor at hand, the bichromate is added thereto, and the mix is agitated for a few minutes. The course of the reaction may be observed by a marked increased intensity of the green coloration normally present in the crude phosphoric acid, the increased green coloration being caused by the reduction of the yellow or orange bichromate to green chromium phosphate. Traces of yellow color in the mixture are easily distinguished from the green, and any excess of bichromate present beyond that required for the oxidation of the organic matter will thus appear. The compounds responsible for the green color are not objectionable, because they are removed later in the process as constituents of the white mud. If, in practice, the condition should arise in which an excess of sodium bichromate has been employed, as will be indicated by a yellowish tinge in the solution, the excess of sodium bichromate may be compensated for by the addition of a further quantity of mixed mother liquor and crude phosphoric acid. In the event that the presence of a large excess of sodium bichromate should be apparent, such excess may be overcome by the addition to the mixture of sodium sulfide or sulfur dioxide or other reducing agent.

As a check on the results observed to take place on the addition of sodium bichromate, a small sample of the resulting liquor may be treated with soda ash to the di-sodium phosphate point, i. e. until the solution is faintly acid to phenolphthalein, the latter condition indicating a solution containing substantially all disodium phosphate and a small amount of mono-sodium phosphate. The di-sodium phosphate liquor thus obtained is filtered, and if a proper quantity of sodium bichromate has been utilized, a brownish yellow tinge, which would normally be present at this point in the case of an untreated liquor, will be found to be substantially absent. In a particular example, a colorimetric titration indicated that approximately 65% of the brownish yellow color had been removed by the bichromate treatment. A further indication of the use of proper quantities of bichromate is that the di-sodium phosphate filtrate will, on standing, remain substantially clear, whereas the filtrate from an untreated liquor, on standing, tends to become cloudy.

The treated mix of mother liquor and crude phosphoric acid is now ready for sodiation, and the clear solution is then further neutralized with soda ash in the usual manner to produce the desired di-alkali phosphate. Upon treatment with soda ash, the chromium phosphate of (1) is precipitated as hydrate, and the phosphate radical of the chromium phosphate is recovered as di-sodium phosphate apparently in accordance with the following equation:

(2) 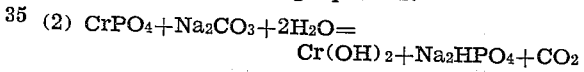
$$CrPO_4 + Na_2CO_3 + 2H_2O = Cr(OH)_2 + Na_2HPO_4 + CO_2$$

Neutralization of the solution with soda ash thus precipitates chromium hydrate, and additionally precipitates as white mud not only the remaining impurities present in phosphoric acid, but also the impurities originally present in the tri-sodium phosphate mother liquors such as sodium aluminate and other soluble metals. After separation of the white mud from the di-sodium phosphate liquor by filtration or otherwise, the white mud is utilized as a constituent of a mix for furnacing in accordance with the process of Levermore U. S. Patent No. 1,866,657, granted July 12, 1932. For example, the white mud is puddled with water, wash water from the digest process, or mother liquor from trisodium phosphate, until the hard cake is broken up, and then the mix is redigested and furnaced. The steps to be performed are to redigest the white mud with sulfuric acid, nitre cake, or a mixture of the two to liberate the phosphate radical (PO₄) and precipitate insoluble calcium sulfate, to form a mix of the liberated phosphate radical and alkali sulfate, and to furnace this mix with carbonaceous material to thereby convert the mix to trialkali phosphate, which is then recovered as such. In this manner the phosphates and alkalies contained in the white mud are recovered and converted to tri-alkali phosphate. Since the chromium added to the system is precipitated along with the white muds on sodiation, the chromium is likewise subjected to the furnacing operation. Notwithstanding the high temperatures obtained in the furnace process, the chromium does not appear to be oxidized to chromate because of the strong reducing conditions present in the furnace. In the furnacing operation, the chromium appears to be converted to the insoluble chromic oxide which is finally discarded in the so-called red muds obtained on dissolution of the furnaced product in water prior to the crystallization of tri-sodium phosphate.

It will thus be seen that the invention provides a process for the treatment of mother liquors containing tri-sodium phosphate and sodium compounds by which the phosphates and sodium of the liquors may be recovered and the sodium utilized for the neutralization of phosphoric acid without requiring discarding of portions of the mother liquors of the system for the purpose of removing oxidizable impurities or reducing the content thereof. The invention affords a method for decolorizing the process liquors by means of a cheap reagent, the use of which does not in any way interfere with the major steps of the process for producing alkali metal phosphates from alkali metal phosphate mother liquors and crude phosphoric acid. Since the chromium is precipitated along with the white muds on sodiation and is finally eliminated from the system by the furnacing operation, to which the white muds are ordinarily subjected for the recovery of phosphates, it is apparent that no additional procedure is required to dispose of the chromium.

The invention is not limited to the treatment of a mixture of mother liquors and crude phosphoric acid. The discoloring impurities oxidized by the present process may originate in the phosphate rock employed in the initial digest of rock and sulfuric acid, and may also have their origin in impurities which work into the liquors during processing, such for example as oily drips from the machinery. The decolorizing treatment of the present invention may, for example, be applied to the crude phosphoric acid prior to the admixture of the acid with the mother liquor. However, since treatment of the mixed mother liquor and acid provides for removal of impurities initially contained in both acid and mother liquor, such treatment of the mixed mother liquor and acid is preferred.

When operating in accordance with the invention to produce alkali metal phosphates other than sodium phosphates, a corresponding alkali bichromate may be employed in the purification stage, for example potassium bichromate where the products of the process are potassium phosphates. It will be understood that the objects of the invention may be accomplished by the treatment of phosphate process liquors with chromic acid itself or by treatment with substances such as bichromates which, in acid solution, form chromic acid. Further, in the appended claims, unless otherwise indicated, the term chromic acid is intended to include chromic acid or salts of chromic acid.

In the appended claims the term "neutralized", unless otherwise modified is intended to define any degree of neutralization of a phosphoric acid solution, and is not limited to indicate complete neutralization. Likewise, the terms relating to decolorization as applied to the treatment of the oxidizable impurities are intended to define any reduction in the intensity of the objectionable color, and are not limited to indicate complete decolorization.

I claim:

1. The method of decolorizing phosphate liquor containing oxidizable impurities which comprises treating the liquor with chromic acid to oxidize discoloring impurities, and then precipitating chromium from the liquor.

2. In the method of producing alkali phosphate involving the neutralization of a liquor containing oxidizable impurities and phosphoric acid, the improvement which comprises treating the liquor with alkali bichromate whereby oxidizable impurities are decolorized, and neutralizing the liquor by the addition of alkali thereto whereby alkali phosphate is formed and chromium precipitated from the liquor.

3. In the method of producing alkali phosphate involving the neutralization of a liquor containing oxidizable impurities and phosphoric acid, the improvement which comprises treating the liquor with alkali bichromate whereby oxidizable impurities are decolorized, partially neutralizing the liquor by the addition of alkali thereby precipitating mud containing chromium and insoluble phosphate compounds, separating the mud thereby obtained from the phosphate liquor, digesting the mud thus separated to liberate the phosphate radical, forming with the liberated phosphate radical a mix with alkali sulfate, and furnacing the mix thus obtained in the presence of a reducing agent to recover alkali phosphate.

4. The method of producing alkali phosphate which comprises forming a phosphoric acid solution containing a soluble phosphate of an alkaline earth metal, adding to the solution an alkali phosphate mother liquor containing an alkali sulfate whereby sulfate is removed from the resulting liquor as a sulfate of the alkaline earth metal and alkali phosphate is formed, treating the liquor with alkali bichromate to decolorize organic impurities therein, partially neutralizing the liquor by the addition of alkali thereby precipitating mud containing chromium and insoluble phosphate compounds, separating the mud thereby obtained from the phosphate liquor, digesting the mud thus separated to liberate the phosphate radical, forming with the liberated phosphate radical a mix with alkali sulfate, and furnacing the mix thus obtained in the presence of a reducing agent to recover alkali phosphate.

5. The method of producing alkali phosphate which comprises forming a phosphoric acid solution containing mono-calcium phosphate, adding to the solution an alkali phosphate mother liquor containing an alkali sulfate whereby sulfate is separated from the resulting liquor as calcium sulfate and alkali phosphate is formed, separating solid residues from the liquor, treating the liquor with alkali bichromate to decolorize oxidizable impurities therein, and further neutralizing the liquor to produce alkali phosphate.

6. The method of producing alkali phosphate which comprises forming a phosphoric acid solution containing mono-calcium phosphate, adding to the solution an alkali phosphate mother liquor containing an alkali sulfate whereby sulfate is separated from the resulting liquor as calcium sulfate and alkali phosphate is formed, separating solid residues from the liquor, treating the liquor with alkali bichromate in quantities less than that required to impart a yellowish tinge to the liquor whereby oxidizable impurities are decolorized, further neutralizing the liquor by the addition of alkali thereto, and separating solid residues from the liquor.

7. The method of producing sodium phosphate which comprises forming a phosphoric acid solution containing mono-calcium phosphate, adding to the solution a sodium phosphate mother liquor containing sodium sulfate, whereby sulfate is removed from the resulting liquor as calcium sulfate and sodium phosphate is formed, separating solid residues from the solution, treating the solution with sodium bichromate to decolorize oxidizable impurities therein, and further neutralizing the liquor to produce sodium phosphate.

8. The method of recovering the sodium content of a sodium phosphate mother liquor containing sodium compounds including sodium sulfate which comprises adding to the liquor a phosphoric acid solution containing mono-calcium phosphate whereby sulfate of the sodium sulfate is precipitated and phosphoric acid partially neutralized separating solid residues from the resulting liquor, treating the solution with sodium bichromate in quantities less than that required to impart a yellowish tinge to the liquor, and further neutralizing the liquor by the addition of an alkaline sodium compound.

9. The method of producing alkali phosphate which comprises forming a phosphoric acid solution containing monocalcium phosphate, adding to the solution such quantities of an alkali phosphate mother liquor containing an alkali sulfate that the alkali sulfate of the mother liquor and the mono-calcium phosphate are present in substantially reacting proportions, whereby calcium sulfate is precipitated from the resulting liquor and alkali phosphate is formed, and treating the liquor with chromic acid to decolorize oxidizable impurities therein.

10. The method of producing alkali phosphate which comprises forming a phosphoric acid solution containing mono-calcium phosphate, adding to the solution such quantities of an alkali phosphate mother liquor containing alkali compounds including an alkali sulfate that the alkali sulfate of the mother liquor and the mono-calcium phosphate are present in reacting proportions, whereby calcium sulfate is precipitated from the resulting liquor and alkali phosphate is produced, and treating the liquor with alkali bichromate to decolorize oxidizable impurities therein.

11. The method of producing sodium phosphate which comprises digesting phosphate rock and phosphoric acid to produce a phosphoric acid solution containing mono-calcium phosphate, adding to the solution such quantities of a sodium phosphate mother liquor containing sodium compounds including sodium sulfate that the sodium sulfate of the mother liquor and the mono-calcium phosphate are present in reacting proportions, whereby calcium sulfate is precipitated from the resulting liquor and sodium phosphate is produced, separating solid residues from the liquor, treating the liquor with sodium bichromate in quantities less than that required to impart a yellowish tinge to the liquor, and further neutralizing the liquor by the addition of sodium carbonate thereto.

12. The method of producing sodium phosphate which comprises forming a phosphoric acid solution containing more than about 3.3% mono-calcium phosphate, adding to the solution such quantities of sodium phosphate mother liquor containing sodium compounds including sodium sulfate that the total alkaline sodium compound in the mother liquor will neutralize the acid solution to such an extent that the mixed liquor of mother liquor and phosphoric acid will contain more than 50% of its $P_2O_5$ content as phosphoric acid, whereby calcium sulfate is precipitated and sodium phosphate is produced, separating solid residues from the solution, treating the liquor with sodium bichromate in quantities less than that required to impart a yellowish tinge to the liquor, and further neutralizing the liquor by the addition of sodium carbonate thereto.

13. The method of producing sodium phosphate which comprises forming a phosphoric acid solution containing mono-calcium phosphate, adding to the solution such quantities of sodium phosphate mother liquor containing sodium compounds including sodium sulfate that the sodium sulfate of the mother liquor and the mono-calcium phosphate content of the acid solution are present in reacting proportions and that the total alkaline sodium compounds in the mother liquor will neutralize the acid solution to such an extent that the mixed liquor of mother liquor and phosphoric acid will contain more than 50% of its $P_2O_5$ content as phosphoric acid, whereby calcium sulfate is precipitated and sodium phosphate is produced, separating solid residues from the liquor, treating the liquor with sodium bichromate to decolorize oxidizable impurities therein, and further neutralizing the liquor by the addition of sodium carbonate thereto.

14. The method of producing sodium phosphates which comprises digesting phosphate rock and phosphoric acid to produce a phosphoric acid solution containing more than about 3.3% mono-calcium phosphate, adding to the solution such quantities of tri-sodium phosphate mother liquor containing sodium compounds including sodium sulfate that the sodium sulfate of the mother liquor and the mono-calcium phosphate are present in reacting proportions and that the total alkaline sodium compounds in the mother liquor will neutralize the acid solution to such an extent that the mixed liquor of mother liquor and phosphoric acid will contain more than 50% of its $P_2O_5$ content as phosphoric acid, whereby the sulfate of the sodium sulfate is precipitated as calcium sulfate and the phosphoric acid partially neutralized, separating solid residues from the liquor, treating the liquor with sodium bichromate in quantities less than that required to impart a yellowish tinge to the liquor, and further neutralizing the liquor by the addition of sodium carbonate thereto.

15. The method of producing alkali phosphate which comprises forming a phosphoric acid solution containing a soluble phosphate of an alkaline earth metal, adding to the solution an alkali phosphate mother liquor containing an alkali sulfate whereby sulfate is removed from the resulting liquor as a sulfate of the alkaline earth metal and alkali phosphate is formed, and treating the liquor with alkali bichromate in quantities less than that required to impart a yellowish tinge to the liquor whereby oxidizable impurities are decolorized.

16. The method of producing alkali phosphate which comprises forming a phosphoric acid solution containing mono-calcium phosphate, adding to the solution an alkali phosphate mother liquor containing an alkali sulfate whereby sulfate is separated from the resulting liquor as calcium sulfate and alkali phosphate is formed, and treating the liquor with alkali bichromate to decolorize oxidizable impurities therein.

17. The method of producing alkali phosphate which comprises forming a phosphoric acid solution containing a soluble phosphate of an alkaline earth metal, adding to the solution an alkali phosphate mother liquor containing an alkali sulfate whereby sulfate is removed from the resulting liquor as a sulfate of the alkaline earth metal and alkali phosphate is formed, and treating the liquor with alkali bichromate to decolorize oxidizable impurities therein.

18. The method of decolorizing phosphate liquor containing oxidizable impurities which comprises treating the liquor with alkali chromate to oxidize discoloring impurities, and then precipitating chromium from the liquor.

19. In the method of producing alkali phosphate involving the neutralization of a liquor containing oxidizable impurities and phosphoric acid, the improvement which comprises treating the liquor with chromic acid whereby oxidizable impurities are decolorized partially neutralizing the liquor by the addition of alkali thereby precipitating mud containing chromium and insoluble phosphate compounds, separating the mud thereby obtained from the phosphate liquor, digesting the mud thus separated to liberate the phosphate radical, forming with the liberated phosphate radical a mix with alkali sulfate, and furnacing the mix thus obtained in the presence of a carbonaceous material to recover alkali phosphate.

20. The method of producing alkali phosphate which comprises forming a phosphoric acid solution containing mono-calcium phosphate, adding to the solution an alkali phosphate liquor containing an alkali sulfate whereby sulfate is separated from the resulting liquor as calcium sulfate and alkali phosphate is formed, separating solid residues from the liquor, treating the liquor with chromic acid to decolorize oxidizable impurities therein, and further neutralizing the liquor to produce alkali phosphate.

21. The method of producing alkali phosphate which comprises forming a phosphoric acid solution containing mono-calcium phosphate, adding to the solution such quantities of alkali phosphate liquor containing alkali compounds including alkali sulfate that the total alkaline compounds in the liquor will neutralize the acid solution to such an extent that the mixture of liquor and phosphoric acid will contain more than 50% of its $P_2O_5$ content as phosphoric acid, whereby calcium sulfate is precipitated and alkali phosphate is produced, and treating the solution with chromic acid to decolorize oxidizable impurities therein.

GEORGE E. TAYLOR.